United States Patent [19]
Green

[11] 3,941,324
[45] Mar. 2, 1976

[54] CABLE STRINGING APPARATUS
[75] Inventor: Lane A. Green, Longview, Tex.
[73] Assignee: Superior Iron Works & Supply Company, Inc., Shreveport, La.
[22] Filed: Sept. 20, 1973
[21] Appl. No.: 398,828

[52] U.S. Cl....... 242/54 R; 242/155 BW; 242/158 F
[51] Int. Cl.² ............... B65H 75/00; B65H 54/28; B65H 59/16
[58] Field of Search.......... 242/54 R, 155 BW, 158, 242/158 F, 158.2, 158.4 R

[56]  References Cited
UNITED STATES PATENTS

| | | | |
|---|---|---|---|
| 2,276,916 | 3/1942 | Barrett | 242/158 F |
| 2,320,554 | 6/1943 | Barrett | 242/158 F |
| 3,037,720 | 6/1962 | Leithiser, Jr. | 242/155 BW |
| 3,168,261 | 2/1965 | Hainer | 242/158 F |

Primary Examiner—Stanley N. Gilreath
Attorney, Agent, or Firm—Hubbard, Thurman, Turner & Tucker

[57] ABSTRACT

A cable stringing device having a rotating bull wheel operative to take up and payout cable is disclosed. The bull wheel is pivotally operated by a hydraulic cylinder. A level wind control system includes limit sensing pilot valves which are actuated by adjustable cams to actuate a control valve to cause the cylinder to oscillate to level wind cable on the reel during take up and to cause the bull wheel to track the cable during payout.

6 Claims, 10 Drawing Figures

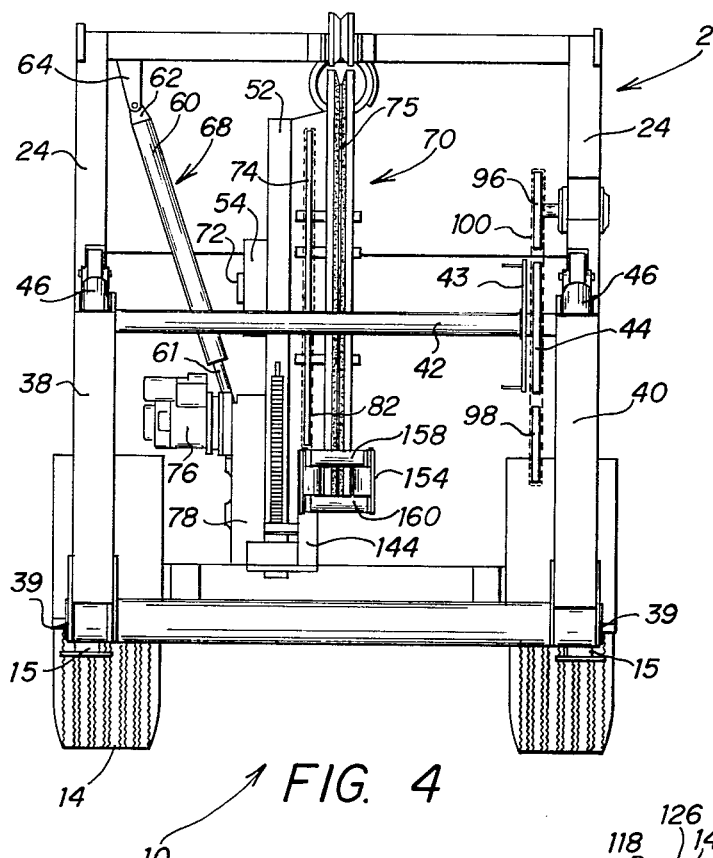
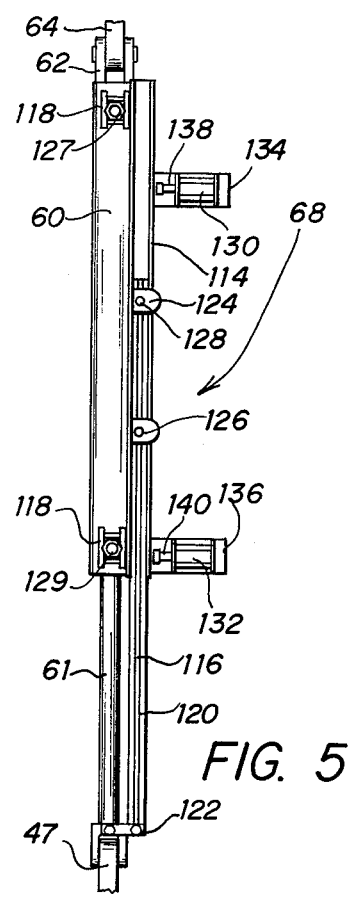
FIG. 4
FIG. 5
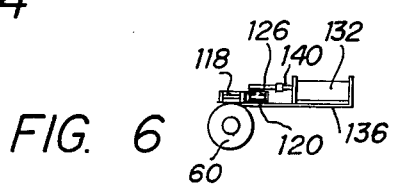
FIG. 6
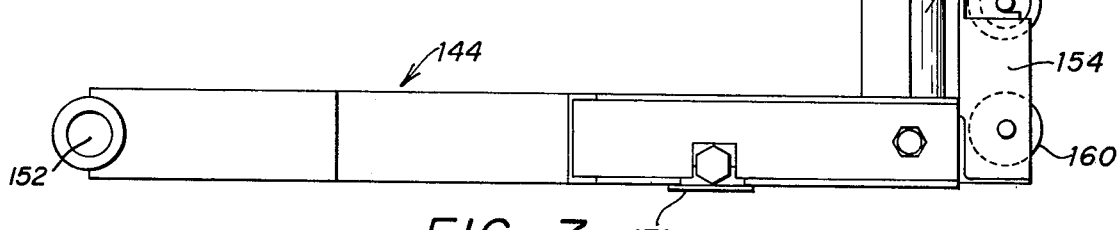
FIG. 7
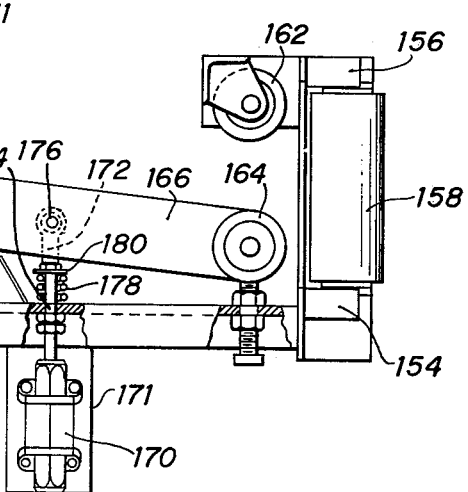
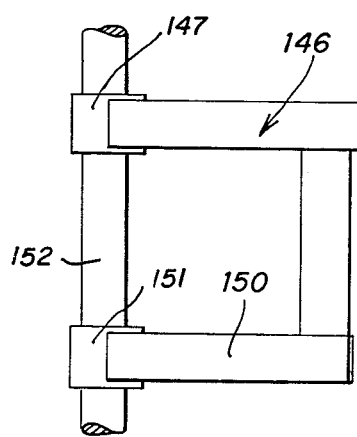
FIG. 8

CABLE STRINGING APPARATUS

The present invention relates to a cable stringing apparatus and more particularly relates to a cable stringing apparatus having a pivotally mounted bull wheel which is automatically controlled to provide positive wind take-up and guided payout of cable.

Electrical transmission lines are normally supported on poles or towers. Transmission lines are installed on the towers or poles by connecting a messenger or pulling rope to the conductor cable, the cable being on a suitable reel mounted on a cable stringing apparatus. The pulling rope is taken up by winding the rope on a drum causing the cable to be unwound from its storage reel and pulled onto the towers or poles. Generally, the cable from the reel is not paid out directly, but rather the transmission cable is partially wound about a payout wheel or bull wheel on the wire stringing apparatus and then strung or discharged to the towers or poles. The operation of the bull wheel is controlled to apply frictional force to the cables so that a suitable tension may be applied during installation of the cable.

The same cable stringing apparatus used for installation of transmission cables can also be used for winding the transmission cables onto storage reels when the transmission cables are removed. As in the case of installation of electrical cables, the line removed is received about a bull wheel or payout wheel and then wound about a reel for storage and handling.

It is known to pivotally mount the bull wheel to the wire stringing apparatus so that as cable is unwound from the reel, the bull wheel maintains alignment with the takeoff point of the cable on the reel to minimize the fleet angle of the cable. However, prior art devices when operating in the take-up or winding mode, do not provide level winding of the cable on the reel. Rather, the cable is wound in random fashion on the cable reel. The random winding of cable on a cable reel can result in difficulties and unbalanced loading of the reel so that removal of the cable from the reel is uneven, making it difficult to apply uniform tension to the cable. Further, the prior devices for controlling the alignment of the bull wheel and the cable during payout have generally not been altogether satisfactory as being complex or unreliable.

The present invention provides a cable stringing apparatus which provides level wind operation as cable is wound on the reel. The cable reel is supported on a cable spindle. A bull wheel is mounted adjacent to spindle and is pivotally attached to the frame of the machine. A linear hydraulic cylinder automatically positions the bull wheel about its pivot point. In level wind, the bull wheel serves as a pulling wheel and is caused to transverse the reel spool to uniformly wind cable on the reel. The cylinder is actuated in response to limit sensing pilot valves that are, in turn, actuated by cams carried on the rod of the bull wheel control cylinder. When one extremity of the reel spool is reached, the pilot valve is tripped by the cam and caused to send a pilot signal to reverse the direction of operation of the bull wheel cylinder. The hydraulic system also includes a manual override control valve which permits the operator to intervene and override the automatic operation of the circuit.

The present invention also provides control of the bull wheel when it is operating as a tension wheel. A hydraulically actuated guide mechanism automatically maintains alignment between the conductor discharged from the supply reel and the bull wheel during payout. This ensures that the fleet angle of the conductor between the supply reel and the bull wheel will be held to a minimum. This mechanism operates to control the bull wheel cylinder by directing pressure fluid to cylinder to maintain the bull wheel in alignment with the conductor. The spool of the control valve is positioned by a spring biased roller in contact with the cable as it is discharged from the reel.

The above and other objects and advantages of the present invention will be better understood with the following description and drawings in which:

FIG. 4 is a rear view of the apparatus of the present invention;

FIG. 5 is an enlarged side view of the level wind control device;

FIG. 6 is an end view of the level wind control device;

FIGs. 7, 8 and 9 are detail views of the cable tension sensing mechanism; and

FIG. 10 is a schematic hydraulic diagram of the hydraulic circuit controlling the level wind in payout operations.

Figure 1:
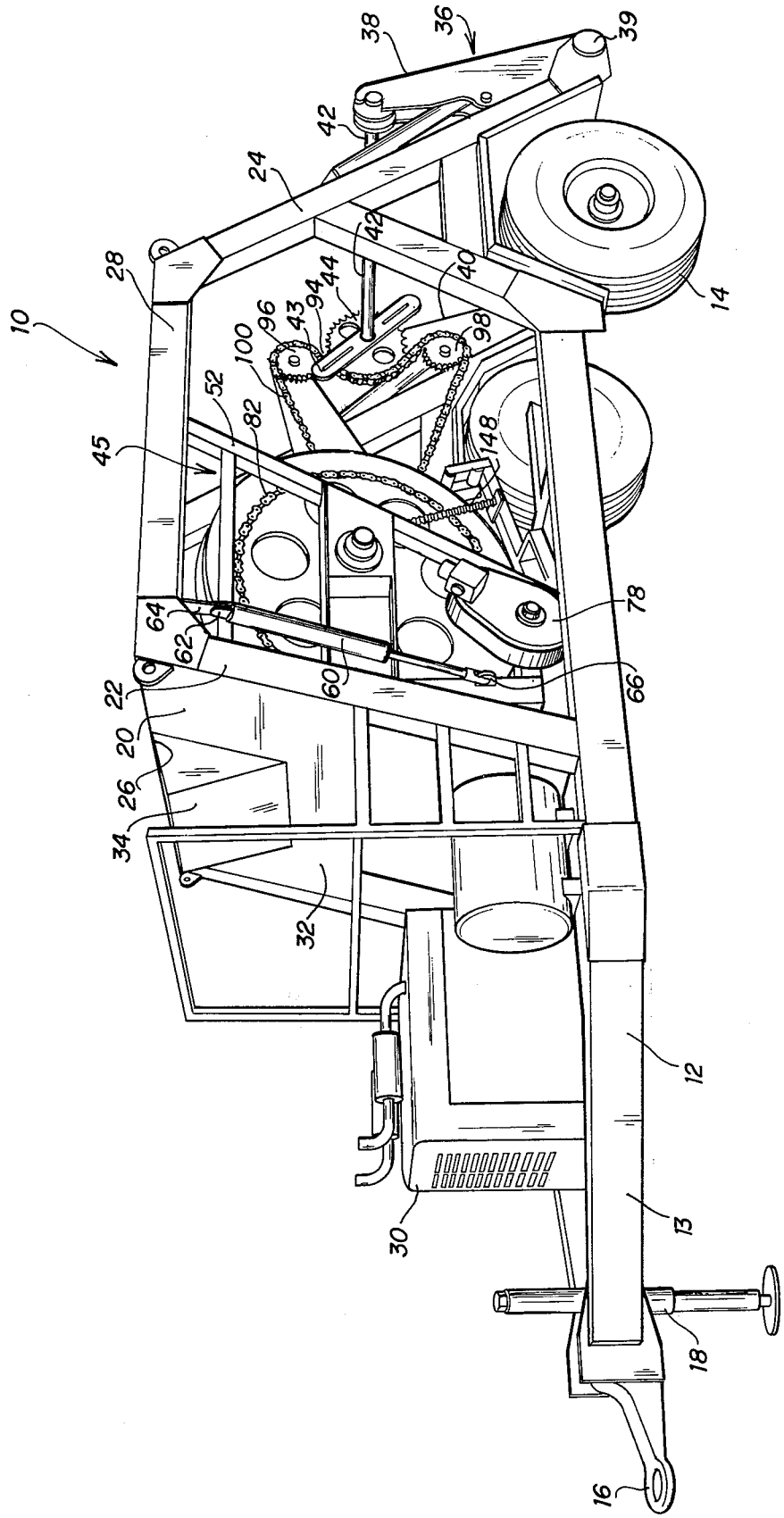
FIG. 1 is a perspective view of the bull wheel apparatus of the present invention.
Figure 2:
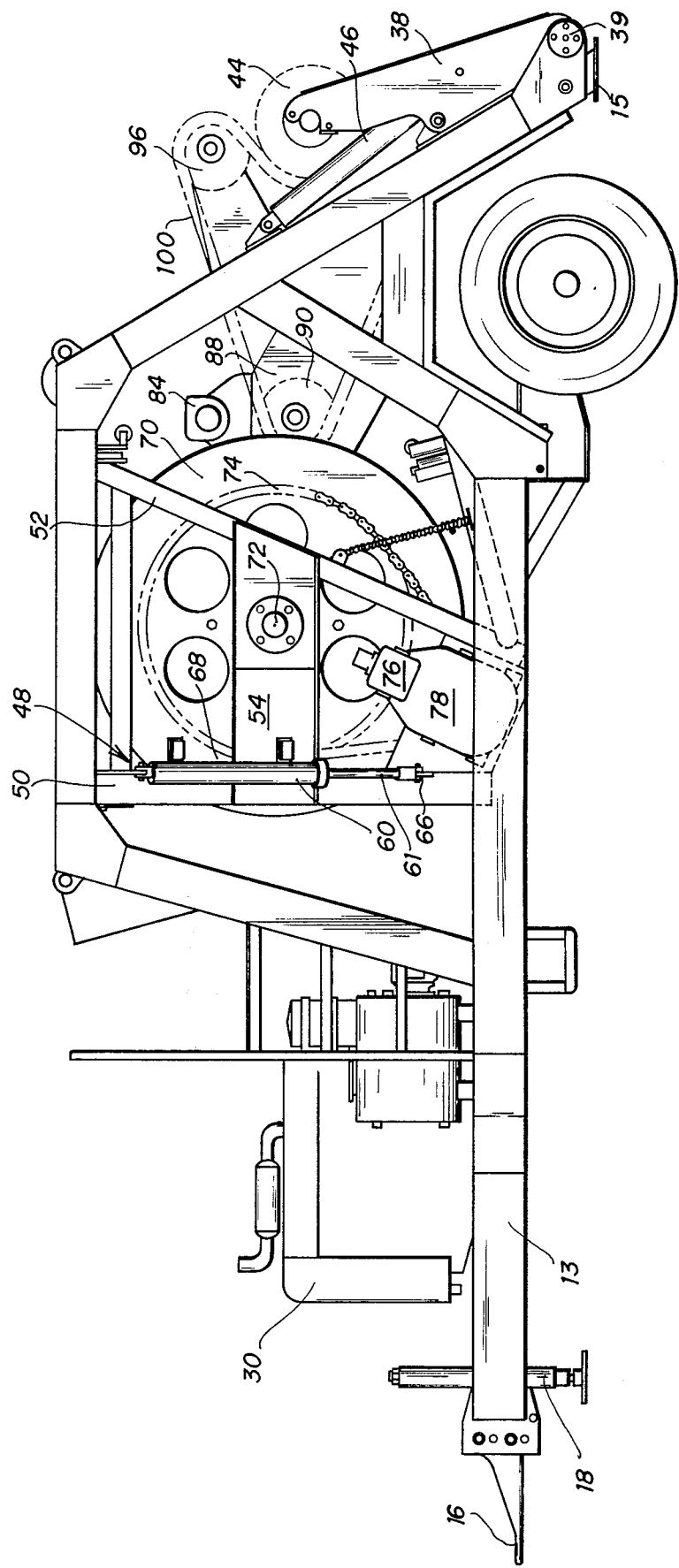
FIG. 2 is a view of one side of the apparatus of the present invention.
Figure 3:
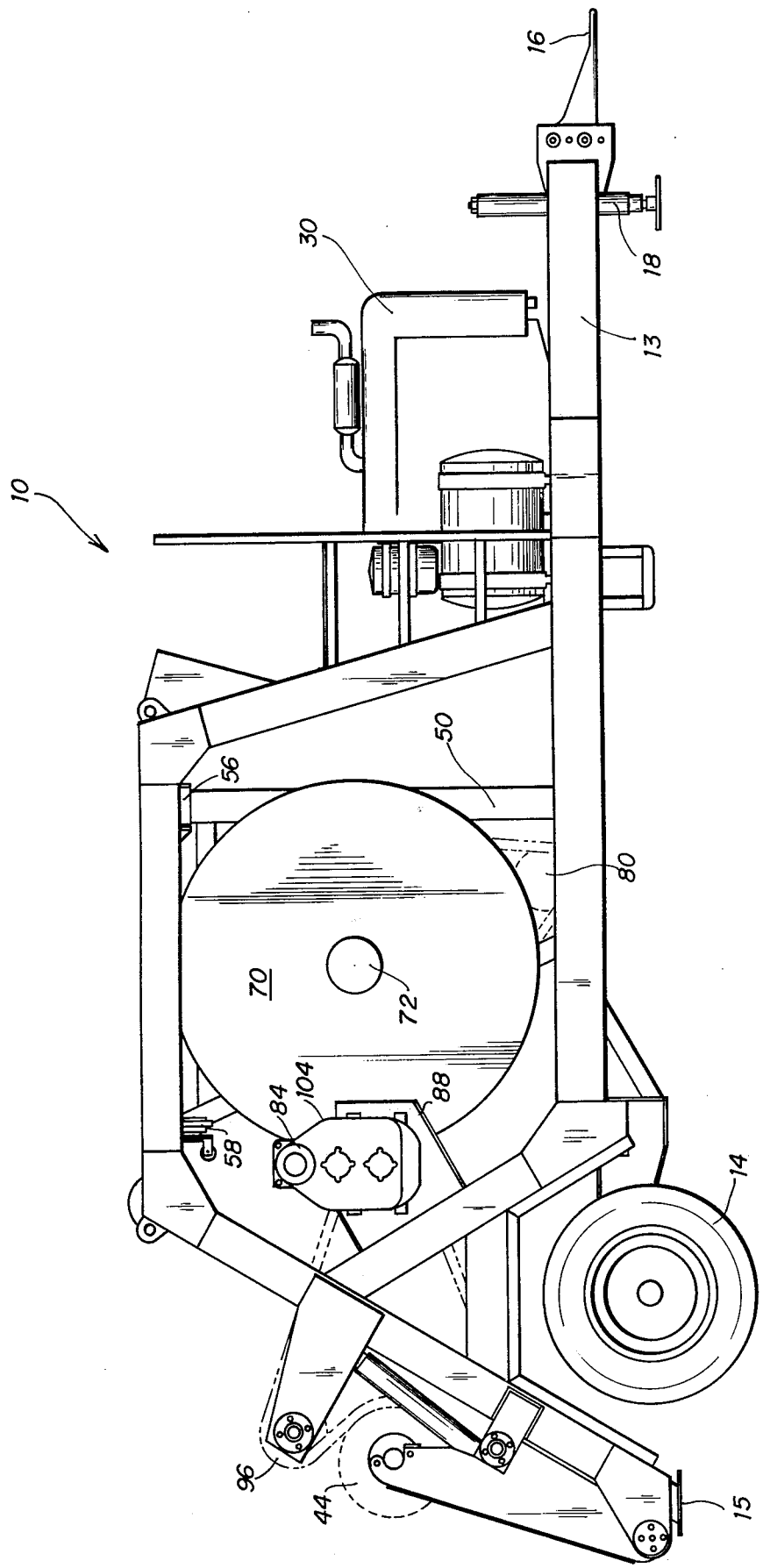
FIG. 3 is a view of the opposite side of the apparatus of the present invention.

Referring now to the drawings, FIG. 1 illustrates the cable stringing apparatus of the present invention generally designated by the numeral 10. Cable tensioning apparatus 10 includes a horizontal chasis or frame member 12 supported on rear wheel and axle assembly 14 for mobility. The forward end of frame 12 has side members 13 which converge at hitch 16 so that the apparatus may be towed by a truck or other vehicle. The forward end of the frame 12 carries a conventional jack 18 which is extensible to support the apparatus whenever the hitch 16 is not connected to the towng vehicle. Rear jacks 15 are adjustable to engage the ground to stabilize the apparatus in operation.

Chasis 12 supports superstructure 20 which includes front frame member 22 and rear frame member 24 and interconnecting transverse and longitudinal upper frame members 26 and 28. A conventional prime mover 30 such as a gas or diesel engine is mounted on the forward part of frame 12 provide the motive power to cable stringing apparatus.

An operator platform 32 is supported between front frame members 22 at a convenient elevation to allow the operator full visual inspection of the operation of the apparatus. Control panel 34 houses the control valves of the hydraulic control circuit and the controls necessary to operate the prime mover.

Reel spindle mechanism 36 is supported at the rear of the cable stringing apparatus 10. The reel spindle device 36 includes opposite arms 38 and 40 which are pivotally joined at their lower end to opposite rear frame members 24 at stub shafts 39. The upper ends of pivot arms 38 and 40 rotatively support a spindle shaft 42 in appropriate journal bearings. One end of spindle shaft 42 carries a sprocket 44 inward of pivot arm 40. Cross arm 43 is adapted to engage the reel for common rotation with shaft 42. Linear hydraulic cylinder 46 is clevis mounted at opposite ends to rear frame member 24 and pivot arm 38. Extension of hydraulic cylinder 46 will accordingly cause spindle shaft 42 to lower into a horizontal reel loading or unloading position. In the operational position shown in FIG. 1, pivot arms 38 and 40 may be pinned to rear frame members 24 to prevent inadvertent lowering of the reel spindle.

The bull wheel support structure 45 includes yoke assembly 48 having front yoke arm 50 connected to rear yoke arm 52 by bracket plate 54. Yoke assembly 48 is pivotally connected to the superstructure 20 at hinges 56 and 58 so that the yoke assembly pivots or swings in a generally transverse arc.

Yoke cylinder 60 has a clevis 62 on the blind end of the housing which is pivotally mounted to support 64 depending from the superstructure 20. The end of cylinder rod 61 of cylinder 60 is pivotally mounted to yoke arm 50 at hinge connection 66. Level wind control mechanism 68 is carried on yoke cylinder 60. The description of operation of the level wind mechanism 68 will be set forth in greater detail hereafter.

Bull wheel 70 is suitably mounted on bearing shaft 72 secured in bearings to bracket plate 54. A peripheral traction ring 75 extends around the bull wheel. Ring 75 is grooved and is of a resilient material having suitable frictional characteristics to retard cable wound about the bull wheel. For more detailed information relative to specific construction of the bull wheel, reference is made to co-pending application Ser. No. 399,082, entitled BULL WHEEL, filed Oct. 9, 1973.

One side of bull wheel 70 carries a large sprocket 74. The lower end of yoke 48 supports an appropriate hydraulic motor 76 which drives gear box 78. The output shaft of gear box 78 carries a sprocket 80 which is in driving relationship with sprocket 74 through power transmission chain 82. Pressure fluid is supplied to hydraulic motor 76 by a suitable hydraulic pump driven by prime mover 30 by conventional interconnecting hydraulic systems. The hydraulic lines have not been illustrated for clarity.

Reel drive motor 84 is similarly supplied with hydraulic motor fluid by hydraulic lines connected to a hydraulic pump driven by prime mover 30. Again, hydraulic lines have not been shown for purposes of clarity. Reel drive motor 84 is coupled to the input shaft of gear reducer 104. Gear reducer 104 is mounted on bracket 88 attached to one of the rear frame members 24. The output shaft of reducer 104 carries a large sprocket 90 and smaller outer sprocket 92 (see FIG. 10). Idler sprockets 96 and 98 are secured to the inner side of right rear frame member 24. Power transmission chain 100 interconnects sprockets 90, 96 and 98. With the reel spindle assembly 36 pivoted away from the frame in the reel loading condition, chain 100 is loosely wound about the sprockets. When pivot arms 38 and 40 are swung into the reel loaded position, sprocket 44, carried on the outer end of reel spindle 36, engages the portion of chain 100 intermediate sprockets 96 and 98 to pull the chain taut. Actuation of reel drive motor 84 will transmit power to shaft 42 causing it to rotate the reel secured with the shaft by bar 43.

Figures 9, 10:
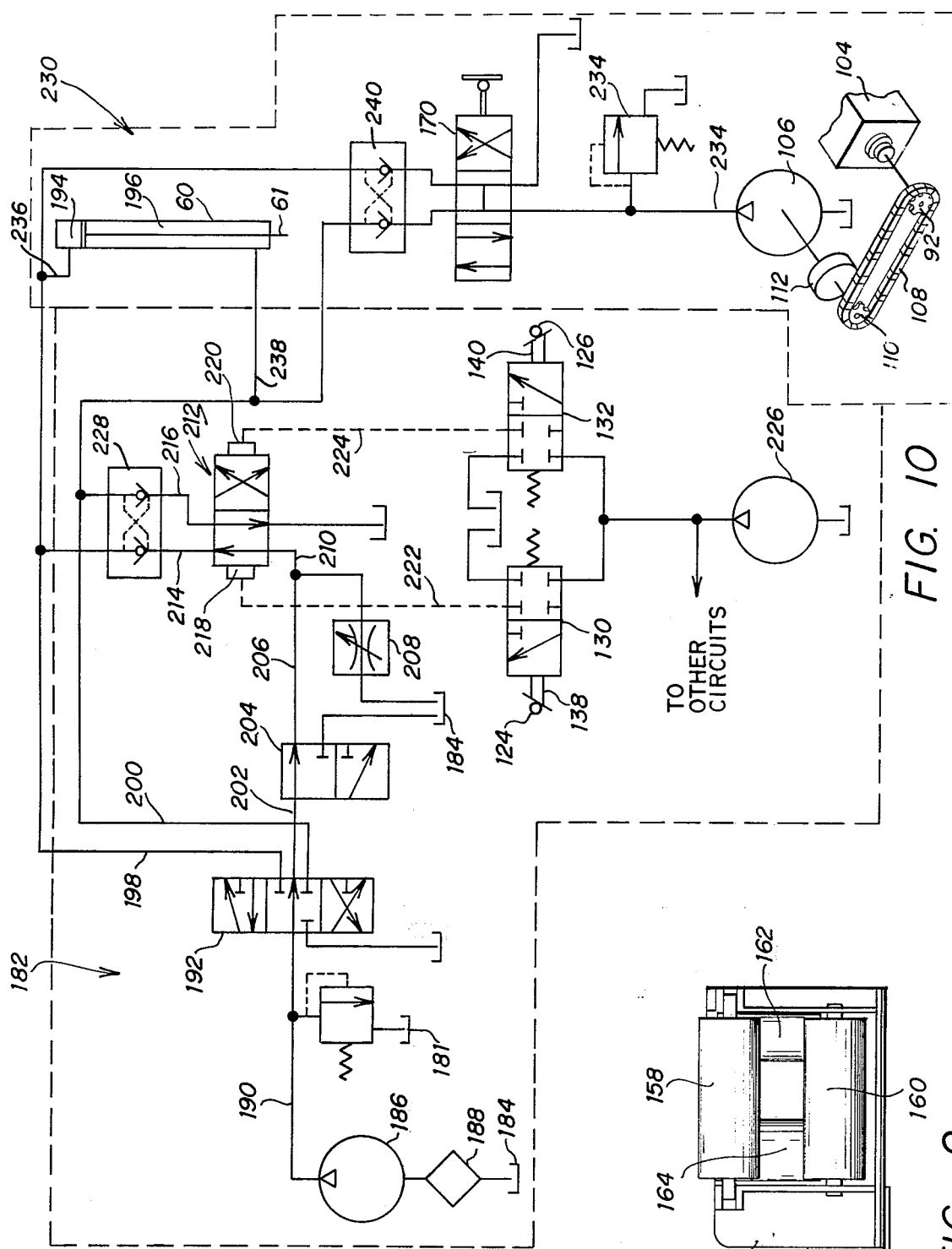

As shown in FIG. 10, sprocket 92 drives hydraulic charging pump 106 which supplies the pressure fluid for actuation of the cylinder 60 in the payout mode of operaion. Sprocket 92 is interconnected by chain 108 to small sprocket 110 which is carried on one side of one-way clutch 112. The opposite side of clutch 112 is connected to drive hydraulic pump 106. One-way clutch 112 permits driving engagement between chain 108 and the input shaft of hydraulic pump 106 only when the output shaft of reel drive gear reducer 104 is operating in the direction of rotation to payout or discharge line from the reel on the reel spindle shaft. The operation of the charging pump will be more fully explained with reference to FIG. 10.

The cable stringing device also includes appropriate braking apparatus utilized to control the rotation of the bull wheel when operating as a tension wheel regulating the tension of the cable that is paid out from the machine. Preferably, the brake is a caliper type disk brake of the type shown in co-pending patent application entitled "Hydraulic Actuator", Ser. No. 335,544, filed Feb. 26, 1973. The high mechanical advantage supplied by the device as shown in this application facilitates precise control over the braking force which is applied to the brake which in turn provides precise control over the tension of the line. Similarly, speed control of the rotational speed of the reel spindle and bull wheel can be achieved by appropriate hydraulic components. For example, the hydraulic pumps and motor in the reel drive and bull wheel drive systems can be of the variable displacemenet type preferably including an appropriate compensator control which alters or changes the displacement of the units in response to pressure changes in the system as related to the desired pressure settings.

Referring not to FIGS. 5 and 6, the level wind of mechanism 68 is shown in greater detail. Level wind mechanism 68, which serves to positively lay the cable on the reel in the take-up mode of operation is carried on yoke cylinder 60. The level wind mechanism 68 includes a slider housing 114 having a "T" shaped slot 116 extending the length of the housing. Slider housing 114 is axially aligned with cylinder 60 and secured to the ports 127 and 129 of cylinder 66 by appropriate brackets 118. "T" slide 120 is reciprocable within slot 116 and is connected to rod 61 of hydraulic cylinder 60 by drive bracket or drive arm 122. Thus, it will be seen that the reciprocation of rod 61 of hydraulic cylinder 66 will in turn reciprocate slider 120 within housing 114.

Cams 124 and 126 are adjustably secured to slide 120 at the upper surface of slider housing 114. The cams are secured by means of adjusting screws 128 projecting through the opening in the upper housing surface at "T" slot 116. Small cam actuator pilot valves 130 and 132 are carried on brackets 134 and 136 respectively, which are laterally supported on housing 114. The plungers 138 and 140, which actuate valves 130 and 132 respectively, project into the linear path of cams 124 and 126. Thus, it will be seen that when cylinder rod 61 is fully extended, cam 126 will engage the plunger 140 of valve 132 to actuate the valve. Conversely, when the cylinder rod is fully retracted, cam 124 carried on slider 120 will engage plunger 138 of valve 130, actuating that valve. The point of actuation of the pilot valves 130 and 132 can be varied by varying the linear position of the cams on the slider 120. As will be more fully explained hereafter, the pilot valves 130 and 132 are, in effect, limit switches which position a main control valve to reverse the direction of operation of linear cylinder 60. Thus, when the bull wheel reaches the end of its swing in one direction laying cable on the cable reel, the appropriate cam valve 130 or 132 will be actuated causing reversal of direction of operation. Other means such as solenoid valves could be used in place of hydraulic valves to effect control of the level wind operation 68.

The payout control mechanism is generally designated by the numeral 144 and is shown in FIGS. 7, 8 and 9. The payout control mechanism 144 includes a support bracket 146 terminating at pivot 147. A parallel leg 150 is affixed to bracket 146 and carries pivot 151. The pivots 147 and 151 are carried on a pivot pin 152 on the lower rear portion of the yoke arm 52 where cable from the supply reel engages the bull wheel. A spring 148 extends between the yoke 48 and bracket 146 on yoke arm 52. A pair of spaced-apart horizontal support plates 154 and 156 are secured to the outer end of bracket plate 146. Horizontal guide rollers 158 and 160 are rotatively supported in the opposite support plates 154 and 156. Rollers 158 and 160 are spaced apart to define an opening therebetween to receive the cable. Vertical guide roller 162 is positioned behind guide plate 156 and extends substantially the length of the opening between horizontal rollers 158 and 160. Vertical motion sensing roller 164 is mounted on arm 166 which is pivotally attached to support 168 at the innerside of bracket 146. The diameter of the sensing roller 164 is varied depending on the diameter of cable with a larger roller bearing with smaller diameter cable. Changing the rollers is easy only requiring the removal of a retainer or cotter pin.

Hydraulic control valve 170 is suitably mounted on a bracket plate 171 extending generally perpendicular from bracket 146. Spool actuator 172 of hydraulic control valve 170 laterally extends through an opening 174 in bracket 146. The outer end of actuator arm 172 is pivotally attached by pivot pin 176 to the intermediate portion of arm 166. Compression spring 178 about actuator arm 172 exerts a biassing force between bracket plate 146 and fixed washer 180 on arm 172. The spring bias serves to urge arm 166 and motion sensing roller 164 toward engagement with the cable extending through the mechanism. Hydraulic valve 170 is an open center, four-way valve and is urged to one of the control positions by the spring. Valve 170, in the payout mode of operation, controls flow of pressure fluid to yoke cylinder 60 to cause the bull wheel to maintain alignment with the cable as it is unwound from the supply spool. The operation of the valve 170 will be better understood from reference to the hydraulic diagram of FIG. 10.

Referring now to FIG. 10, both the level wind and payout control circuits are shown. The left-hand portion of the schematic level wind control system is generally designated by the numeral 182 and is enclosed within dotted lines. The level wind system 182 includes a source of hydraulic fluid 184 connected to pump 186 across hydraulic filter 188. Pump 186 may be any conventional positive displacement type hydraulic pump such as a gear or vane pump. Pump 186 is driven by prime mover 30 and may be located at any convenient location on the cable tensioning device. The output of pump 186 is connected by line 190 to control valve 192. Control valve 192 is a three-position valve having a normal position as illustrated in FIG. 10 allowing fluid pressure to pass through the valve to supply the circuit with fluid pressure downstream of the valve. Valve 192 may be actuated to supply pressure fluid through line 200 to chamber 196 hydraulic cylinder 60 and interconnect chamber 194 to reservoir 184. In the opposite position, valve 192 directs pressure fluid to chamber 194, via line 198 and connects opposite cylinder chamber 196 with reservoir 184. Normally, however, valve 192 is actuated only when it is desired to manually override the automatic operation of the level wind system.

Line 202 connects valve 192 to selector valve 204. Selector valve 204 is a two-position valve which in the position shown, places the level wind hydraulic circuit in automatic operation. Upward actuation of valve 204 will place the level wind circuit in an "off" or inactive condition. Valve 204 is connected to speed control valve 208 by hydraulic line 206. Speed control 208 is a flow divider type valve which is infinitely positioned to direct fluid delivered to the valve to either reservoir 184 or through line 210 to the yoke cylinder 60. As is well known, the rate of flow to a linear cylinder controls the speed of operation of the cylinder.

Line 210 is connected to two-position pilot operated valve 212. Lines 214 and 216 connect valve 212 to lines 198 and 200 and to opposite cylinder chambers 194 and 196 of yoke cylinder 46. Valve 212 is operated by the pilot signals received at opposite control chambers 218 and 220 via lines 222 and 224 respectively. Pilot lines 222 and 224 are respectively connected to pilot valves 130 and 132, carried on level wind mechanism 68, secured to the yoke cylinder 60. Pilot valves 138 and 140 are normally biassed to position shown so that no pressure signal from charge pump 226 is delivered across the valve to pilot lines 222 and 224. However, when one of the cams 124 and 126 comes into contact with the associated plunger 138 and 140, the respective pilot valve will be moved to a position to send a pilot signal to valve 212. In response to the pilot signal, valve 212 will actuate the yoke cylinder 60 in the reverse direction of reciprocation. Thus, when the bull wheel reaches the end of the reel spool, the corresponding pilot valve 130 and 132 is actuated to reverse the direction of transverse of the bull wheel. Thus, cable is wound on the cable reel with the bull wheel operating as a pulling wheel continually reciprocating across the reel spool.

Lock valve 228 is internally piloted to permit flow through either line 214 and 216 when fluid pressure is applied to either of these hydraulic lines. Lock valve 228 may be incorporated within control valve 212.

The hydraulic circuit controlling the payout mode of operation is shown schematically in the right-hand portion of FIG. 10 and is enclosed within dotted lines and is generally designated by the numeral 230. Payout circuit 230 includes pump 106 which is, as has been described above, driven by the reel drive across one-way clutch 112. When the reel drive is actuated in the direction of rotation to payout cable, pump 106 is operativvely driven across clutch 112 and pressure fluid is delivered through line 232. Conventional relief valve 234 serves to protect the circuit.

Control valve 170 is operatively positioned by engagement of motion sensing roller 164 with the cable. The sensed cable movements move arm 172 to automatically position the yoke cylinder 60 to maintain the bull wheel in alingment by directing fluid to the appropriate cylinder chamber. Hydraulic lines 236 and 238 communicate valve 170 with opposite cylinder chambers 194 and 196 of payout yoke control cylinder 60. Conventional lock valve 240 prevents bleeding of pressure fluid from the cylinder chambers in a static condition. It will thus be seen that control valve 170 automatically responds to the lateral movements of the cable as it is unwound to accordingly actuate cylinder 46 to pivotally move the bull wheel into continuous alignment with the cable. The aligned discharge of payout cable results in a smoother operation and reduced wear and stress imposed on the cable.

A more complete understanding of the present invention will be had from the following description of operation of the tension stringing device of the present invention. The device 10 is connected at hitch 16 behind a suitable towing vehicle and is located at the construction site with the trailer aligned with the towers or poles. Jacks 15 and 18 are extended to engage the ground and stabilize the unit. If cable is to be removed from the towers or poles, an empty cable reel will be loaded on the reel spindle shaft 42 by lowering appropriate pivot arms 38 and 40 by means of hydraulic cylinder 46. Once the reel is loaded on the spindle, hydraulic cylinder 46 is retracted and the reel is in operative position with the sprocket 44 on the end of spindle shaft 42 opertatively engaged with chain 100. Prime mover 30 is started to power the hydraulic system and operate pump 186. Similarly, the reel drive and bull wheel circuits are powered. Selector valve 204 is moved downwardly to direct pressure fluid to main control valve 212 and to bull wheel yoke cylinder 60. Valve 212 is positoned in response to actuation of pilot valves 130 and 132. The bull wheel yoke is controlled by cylinder 60 to positively lay cable on the spool in a take-up mode of operation. The cable is discharged from the lower portion of the bull wheel at a location adjacent the reel. When the lateral end of the reel spool is reached, the appropriate cam 124, 126 will actuate one of the corresponding pilot valves to send a pilot signal to valve 212 reversing the position of valve 212. This will cause pressure fluid to be delivered to the opposite cylinder chamber of yoke cylinder 60 reversing the travel of piston rod 61 and the bull wheel. If it is desired to reduce the speed of operation of the level wind circuit, speed control valve 208 is moved to a flow restricting position to divert a greater quantity of pressure fluid to the reservoir.

Note that in this mode of operation, the mechanism for laying cable on the spool as the cable is taken up is completely automatic and is controlled by the level wind mechanisms. However, for some reason the operator wishes to manually override the automatic operation of level winding mechanism, valve 192 can be appropriately actuated to one of the two overriding positions and pressure fluid from pump 186 will be delivered either to line 198 or 200 to the appropriate cylinder chamber to actuate bull wheel yoke cylinder 60 in a manual mode. If it is desired to stop the bull wheel at a desired position, selector valve 204 can be moved upwardly causing interruption of the flow of pressure fluid. Lock valve 228 will prevent creep of the yoke cylinder 60 in the hold position.

Cams 124 and 126 are adjustable on slider 120 and can accordingly, be positioned to accommodate varying spool widths. This is simply done by releasing set screws 128 and sliding the cams 124 and 126 to the appropriate linear position on the slider.

If it is desired to operate the wire tensioning device of the present invention in a wire stringing or payout mode of operation, a reel containing suitable cable is loaded on the machine at spindle shaft 42. With the loaded reel in place, the end of the cable is attached to a pilot line. The pilot line, for example, would be a manila or similar rope of a non-conductive material which is strung over the transmission towers or poles. The pilot line is attached to a second apparatus having an empty take-up reel positioned in alignment a distance from the device 10 along the transmission line. When the second apparatus is actuated to wind the non-conductive rope, tension is placed upon the cable and the cable is pulled over the towers, unwinding the cable from the supply reel. As the cable is unwound, the lateral movements of the cable will be sensed by roller 164. In the payout mode of operation, pump 106 will be powered across clutch 112. If as seen in FIG. 8 the cable is moving away from the valve 170, the bias of spring 178 will urge arm 172 to the right, directing pressure fluid to cylinder chamber 196. The valve will be biassed to this position until the bull wheel aligns with the cable and the cable again contacts the sensing roller 164 depressing arm 172 inwardly against the force of the spring. when the cable exerts a sufficient lateral force on the sensing roller 164, the valve 170 will be moved leftwardly against the biassing spring so the pressure fluid will be delivered to the opposite cylinder chamber 194. This will of course cause a reversal of the direction of operation of the bull wheel. In this way, the bull wheel will follow the movements of the cable and continuos alignment will be maintained between the cable as it is discharged from the reel and the bull wheel.

As soon as the payout mode of operations are terminated and the reel drive is returned to a level wind mode of operation, pump 106 is de-clutched and payout circuit is inoperative. Note that the payout circuit remains inoperative during the entire level wind operation.

Thus, it will be seen that the present invention provides a cable stringing apparatus having positive, automatic level wind and guided payout control. The bull wheel is operable as a pulling wheel to haul in cable or as a tension wheel to retard payout. The device is compact, rugged and convenient to operate. The present invention is subject to various modifications and changes as will readily occur to those skilled in the art. It is not desired to limit the invention to the construction and operation shown and described, and accordingly, all such modifications and changes are intended to be within the spirit and scope of the present invention as claimed.

What is claimed is:

1. A cable stringing device comprising:
   a supporting mobile frame;
   cable reel support means including a cable reel spindle adapted to mount a reel having a cable receiving spool portion and reel drive means for rotating said spindle in one direction for payout and the opposite direction for take-up;
   a bull wheel pivotally mounted to said frame having its pivotal axis substantially perpendicular to said spindle and having a portion adjacent said cable reel support means;
   positioning means including a hydraulic cylinder having an extensible rod for pivoting said bull wheel about its axis, whereby said bull wheel portion transverses said reel spool;
   a level wind mechanism for controlling the laying of cable onto said spool including limit sensing means to sense when the cable is wound to a predetermined position on said reel spool when said spindle is rotated in a cable take up direction and control means responsive to said limit sensing means to reverse the pivoting direction of said bull wheel upon actuation of said limit means whereby said cable is positively wound in reciprocating fashion on said reel spool, said limit sensing means including a pair of pilot valves operatively positioned to control flow of pressure fluid to said cylinder and further including cam means carried by said extensible rod adapted to actuate one pilot valve upon extension and the other pilot valve upon retraction of the rod; and guide means for moving said bull wheel in response to the cable movement along the spool when said cable spindle is rotated in a payout direction of operation, said guide means including a control valve operatively connected to said cylinder having an extendible arm biased toward engagement with said cable, roller means carried on said arm engaging said cable, hydraulic pump means adapted to supply pressure fluid to said valve, and clutch means operatively connecting said pump to said reel drive whereby said guide means is operative only when said reel is operated in a payout direction of operation.

2. A cable stringing device comprising;

a supporting mobile frame;

cable reel support means including a cable reel spindle adapted to mount a reel having a cable receiving spool portion and reel drive means for rotating said spindle in one direction for payout and the opposite direction for take-up;

a bull wheel pivotally mounted to said frame having its pivotal axis aubstantially perpendicular to said spindle and having a protion adjacent said cable reel support means;

posistioning means for pivoting said bull wheel about its axis, whereby said bull wheel portion transverses said reel spool;

a level wind mechanism for controlling the laying of cable onto said spool including limit sensing means to sense when the cable is wound to a predetermined position on said reel spool when said spindle is rotated in a cable take up direction and control means responsive to said limit sensing means to control said positioning means to reverse the pivoting direction of said bull wheel upon actuation of said limit means whereby said cable is positively wound in reciprocating fashion on said reeel spool; and guide means for moving said bull wheel in response to the cable movement along the spool when said cable spindle is rotated in a payout direction of operation, said guide means including a control means operatively connected to said positioning means, and means for rendering said guide means operative only when said reel is operated in a payout direction of operation.

3. The cable stringing device of claim 2 including means for manually overriding the operation of said level wind mechanism.

4. The cable stringing device of claim 2 wherein said positioning means comprises a hydraulic cylinder having an extensible rod and said limit sensing means comprise a pair of pilot valves operatively positioned to control flow of pressure fluid to said cylinder and further including cam means carried by said extensible rod adapted to actuate one pilot valve upon extension and the other pilot valve upon retraction of the rod.

5. The cable stringing device of claim 4 wherein said guide means includes a control valve operatively connected to said cylinder having an extendible arm biased toward engagement with said cable, roller means carried on said arm engaging said cable, hydraulic pump means adapted to supply pressure fluid to said valve, and clutch means operatively connecting said pump to said reel drive whereby said guide means is operative only when said reel is operated in a payout direction of operation.

6. The cable stringing device of claim 4 wherein said cam means are adjustable to vary the extent of travel of said bull wheel means along said reel spool.

* * * * *